United States Patent
Mantin

(10) Patent No.: US 10,554,707 B2
(45) Date of Patent: *Feb. 4, 2020

(54) METHOD AND SYSTEM FOR SELF-DETECTION AND EFFICIENT TRANSMISSION OF REAL-TIME POPULAR RECORDED OVER-THE-TOP STREAMS OVER COMMUNICATION NETWORKS

(71) Applicant: imVision Software Technologies Ltd., Ramat Gan (IL)

(72) Inventor: Sharon Mantin, Tel Aviv (IL)

(73) Assignee: imVision Software Technologies Ltd., Ramat Gan (IL)

( * ) Notice: Subject to any disclaimer, the term of this patent is extended or adjusted under 35 U.S.C. 154(b) by 801 days.

This patent is subject to a terminal disclaimer.

(21) Appl. No.: 14/458,461

(22) Filed: Aug. 13, 2014

(65) Prior Publication Data

US 2015/0049762 A1 Feb. 19, 2015

Related U.S. Application Data

(60) Provisional application No. 61/865,401, filed on Aug. 13, 2013.

(51) Int. Cl.
*H04L 29/06* (2006.01)

(52) U.S. Cl.
CPC ........ *H04L 65/4076* (2013.01); *H04L 65/602* (2013.01); *H04L 65/80* (2013.01)

(58) Field of Classification Search
None
See application file for complete search history.

(56) References Cited

U.S. PATENT DOCUMENTS 6,859,839 B1 * 2/2005 Zahorjan ............... H04N 7/173
709/231
7,082,142 B1 7/2006 Begeja
(Continued)

FOREIGN PATENT DOCUMENTS

JP 2004080566 A 3/2004
WO WO 2013037032 A1 * 3/2013 ........... H04N 21/266

OTHER PUBLICATIONS

Bouten et al., "A Multicast-Enabled Delivery Framework for QoE Assurance of Over-The-Top Services in Multimedia Access Networks"; Journal of Network and Systems Management, DOI 10.1007/s10922-013-9262-8, published online Jan. 17, 2013; Springer Science+Business Media, New York.

*Primary Examiner* — Peter Chen
*Assistant Examiner* — Jeff Banthrongsack
(74) *Attorney, Agent, or Firm* — M&B IP Analysts, LLC

(57) ABSTRACT

A method and system for delivery of real-time popular recorded over-the-top (OTT) streams in a broadband network are provided. The method includes monitoring OTT streams flow in the broadband network; for each monitored OTT stream, determining if a type of a monitored OTT stream is a recorded OTT stream; upon determining that the type of a monitored OTT stream is a recorded OTT stream, determining an efficiency in delivering the recorded OTT stream in a multicast format; reformatting the recorded OTT stream into a multicast OTT stream, if the recorded OTT stream can be efficiently delivered in a multicast format; and delivering the recorded OTT stream as a multicast OTT stream to a user edge device over the broadband network.

22 Claims, 7 Drawing Sheets

(56) References Cited

U.S. PATENT DOCUMENTS

| | | | |
|---|---|---|---|
| 7,412,531 B1* | 8/2008 | Lango | H04L 65/605 |
| | | | 709/231 |
| 7,698,724 B1 | 4/2010 | Day | |
| 8,117,259 B2 | 2/2012 | Macwan | |
| 8,510,770 B1* | 8/2013 | Oztaskent | H04L 67/22 |
| | | | 705/319 |
| 8,826,349 B2 | 9/2014 | Joe et al. | |
| 9,110,988 B1* | 8/2015 | Tan | G06F 17/30784 |
| 2005/0037740 A1 | 2/2005 | Smith et al. | |
| 2008/0114882 A1 | 5/2008 | Christenson | |
| 2009/0300185 A1 | 12/2009 | Letellier et al. | |
| 2010/0077438 A1* | 3/2010 | Ansari | H04N 7/17318 |
| | | | 725/91 |
| 2010/0211794 A1 | 8/2010 | Bilobrov | |
| 2010/0250772 A1* | 9/2010 | Mao | H04N 21/222 |
| | | | 709/231 |
| 2010/0281105 A1 | 11/2010 | Sebastian | |
| 2011/0051646 A1* | 3/2011 | Rice | H04L 12/185 |
| | | | 370/312 |
| 2012/0157043 A1 | 6/2012 | LaJoie et al. | |
| 2013/0070622 A1 | 3/2013 | Degioanni et al. | |
| 2013/0108173 A1 | 5/2013 | Lienhart et al. | |
| 2013/0132986 A1* | 5/2013 | Mack | H04L 65/605 |
| | | | 725/14 |
| 2013/0268986 A1 | 10/2013 | Venkatachalam et al. | |
| 2013/0276017 A1 | 10/2013 | Walker et al. | |
| 2013/0276035 A1 | 10/2013 | Walker et al. | |
| 2014/0129570 A1* | 5/2014 | Johnson | H04N 21/4126 |
| | | | 707/748 |
| 2014/0129680 A1 | 5/2014 | Mukherjee | |
| 2014/0348165 A1 | 11/2014 | Frydman et al. | |
| 2015/0049762 A1 | 2/2015 | Mantin | |
| 2015/0201225 A1 | 7/2015 | Yin | |
| 2015/0331942 A1 | 11/2015 | Tan | |

* cited by examiner

METHOD AND SYSTEM FOR SELF-DETECTION AND EFFICIENT TRANSMISSION OF REAL-TIME POPULAR RECORDED OVER-THE-TOP STREAMS OVER COMMUNICATION NETWORKS

CROSS-REFERENCE TO RELATED APPLICATIONS

This application claims the benefit of U.S. Provisional Application No. 61/865,401 filed on Aug. 13, 2013, the contents of which are hereby incorporated by reference.

TECHNICAL FIELD

The present invention relates generally to transmission of live over-the-top (OTT) streams and, more particularly, to self-detection and efficient transmission of real time popular recorded over-the-top (OTT) video and audio streams.

BACKGROUND

The world of digital delivery of multimedia content to viewers has been rapidly progressing. Typical types of multimedia content include video clips, electronic games, and interactive content. The delivery process for such multimedia content, particularly those transmitted in a form of video, may entail use of a variety of delivery standards, video quality levels, and other parameters. The techniques used in traditional television (TV) broadcast cannot be effectively used in the more modern multi-standard digital TV arena. Currently, only piecemeal solutions are available for efficient and seamless delivery of such multimedia content to the arena of digital TV.

Specifically, content delivery is currently performed using two main approaches: legacy content distribution and over-the-top (OTT) content distribution. Legacy content providers include, for example, cable, satellite, and internet protocol TV (IPTV) providers. Typically, such providers have full control over the entire delivery chain from a central location where the content is originated and transmitted (head-end) through the network to the end user's device (e.g., a set-top box). Therefore, legacy content providers can manage and guarantee efficient content delivery mechanisms and high Quality of Experience (QoE) to the end user.

Over-the-top (OTT) content distribution is the delivery of audio, video, and other types of multimedia content over the Internet typically without any control of the content distribution by the network operators and/or by the content providers. The providers of OTT content are typically third party providers which utilize the network's infrastructure to provide content to their subscribers. As such, OTT content providers are not responsible for controlling redistribution of the content. Examples for OTT content providers are Hulu®, Netflix®, and the like.

In most cases, OTT content providers control only the edges of a content distribution network, i.e., the streaming server at the head-end or equivalent locations such as points of presence (POPs) and a player located at a user's edge device (UED). These edges are typically HTTP media streaming servers connected in the Internet and the media players installed in user devices. The media is streamed from the media servers toward each of the end user's devices as a transmission control protocol (TCP) based unicast stream. Such streams consume network resources (e.g., bandwidth per each content consumer) through the path between the media streaming server and the end user device. This architecture results in a linear growth of network resources where each added consumer increases the consumed network resources. However, as noted above, OTT content providers have no control over the distribution network. Rather, such providers merely utilize the network's infrastructure to deliver content. As such, OTT content providers are not responsible for the overall efficiency of OTT content distribution over the network and, as such, cannot guarantee high QoE to their subscribers.

The popularity of OTT services downgrades the overall performance of the communication networks managed by ISPs, cellular operators, and fixed-line operators. Specifically, OTT content delivery significantly increases the bandwidth consumption in such networks. As a result, ISPs cannot ensure high Quality of Service (QoS) to their subscribers, thereby forcing ISPs to upgrade their networks to support the increased demand for bandwidth. In addition, congested networks cause higher packet losses and longer packet delays, thereby downgrading the QoE of OTT streaming services.

Various types of OTT content or streams can be streamed over a network. For example, the type of the streamed content may be live, linear, replicated, or recorded. A live OTT stream is a transmission of a live content (e.g., a sports match, a concert, news, etc.). A linear stream is a broadcasted content, such as a TV show broadcasted over the Internet. In both live and linear OTT streams, all viewers watch the same stream substantially at the same time. In contrast, recorded content such as content from a video on demand (VoD) service, may be viewed by different viewers in asynchronous manners, i.e., each user can start watching the recorded content at any time, and the viewing times of users may fully overlap, may partially overlap, or may not overlap at all. As a result of this asynchronicity, existing solutions cannot effectively provide such content to multiple viewers in multicast format, as multicast format typically requires synchronized viewing of the delivered content.

Streamed OTT content can be delivered in two forms: managed and unmanaged. The managed OTT content refers to content owned by a network operator that is delivered by the operator or through one of its partners. As such, the network operator controls the media streaming server and, therefore, can determine if the delivered content can be multicasted, as well as the number of concurrent viewers of the streamed content. The unmanaged OTT content refers to content being delivered transparently over the broadband network. As such, the network operator does not have any information regarding the type of the content being streamed or the number of concurrent viewers.

Types of broadband networks include fixed-line networks and cellular networks, also known as mobile networks. Typical fixed-line networks (also known as landline networks) provide services to equipment via a wire. Typical cellular networks are wireless networks distributed over one or more land areas (known as cells), wherein each cell contains at least one transceiver which is used to provide service in the cell. Cellular networks may feature multimedia broadband multicast systems, which enable broadcast and multicast services of OTT content over such networks.

FIG. 1 shows a schematic diagram of an end-to-end multimedia broadband multicast system (MBMS) 100 for delivery of OTT managed content. A user equipment device (UED) 110 is connected to a cellular network 120 through a unicast communication channel 145 and, optionally, to a broadcast and multicast communication channel 135. The UED 110 typically executes a media player that plays the streamed content.

A content provider (not shown) provides the UED 110 with a portal (not shown) to access the content via a browser or application installed on the UED 110. The content provider streams managed OTT content from a streaming server 150 to the UED 110 through the cellular network 120. The delivery of the OTT managed content can be performed through two sub-networks: a multimedia broadcast multicast service (MBMS) network 130, and a packet data network 140.

In cellular networks, a MBMS (also known as eMBMS) is a standardized service which enables broadcast and multicast services of managed OTT content over cellular networks. The MBMS network 130 defines a point-to-multipoint interface for existing and upcoming 3GPP-based cellular networks, such as defined in the 3GPP standard specifications 3GPP TS 22.246, 43.246, 36.440, 25.346, 23.346, and 22.146. The MBMS is designed to provide efficient delivery of broadcast and multicast services, both within a cell as well as within the core network. For broadcast transmissions across multiple cells, the MBMS defines transmission via single-frequency network (SFN) configurations. Target applications include mobile television and radio broadcasting, as well as file delivery and emergency alerts. Delivery of content over the MBMS requires collaboration between the content owner and/or CDN and the cellular network operator.

The MBMS network 130 is further described with respect to FIG. 2. The architecture shown in FIG. 2 is a MBMS network 130 defined for long term evolution (LTE)-based cellular networks. An E-UTRAN 210 is a LTE radio network connection that connects the UED 110 (not shown in FIG. 2) with a cellular network (e.g., cellular network 120 (not shown in FIG. 2)). Such connection is typically provided via the broadcast/multicast communication channel 135.

The MBMS network 130 also includes a mobility management entity (MME) 220 that is responsible for the control and signaling of the network 130. The E-UTRAN 210 receives content via the broadcast/multicast communication channel 135. Additionally, the E-UTRAN 210 is connected to a MBMS gateway (MBMS-GW) 230, which provides multicast and broadband transmissions. The MBMS-GW 230 is further communicatively connected to a broadcast multicast service center (BM-SC) 240, which is responsible for connecting between the source of the content (not shown) and the MBMS network 130.

Referring back to FIG. 1, the packet data network 140 carries unicast data services. As illustrated in FIG. 3, a typical packet data network 140 includes an E-UTRAN 310 which is an LTE radio network connection that connects the UED 110 with the cellular network. Such a connection is typically provided via a unicast communication channel 145. The cellular connectivity is facilitated by a MME 320 which provides control and signaling of the packet data network 140, a service gateway (S-GW) 330 that provides packet routing and forwarding, and a packet data network gateway (P-GW) 340. The P-GW 340 is a link between the mobile device and the services that reside in an external packet network.

To summarize the above discussion, in conventional solutions, unicast (un-managed) OTT streams would be delivered through the packet data network 140 while multicast (managed) OTT streams would be delivered through the MBMS (or eMBMS) network 130.

Existing solutions for multicasting OTT stream content are discussed in the related art. However, such solutions are limited as they cannot provide efficient delivery and detection of recorded, non-live, non-linear, or on-demand OTT content (collectively referred to as recorded OTT content or recorded OTT streams). In particular, such solutions cannot detect in real-time current popular recorded OTT content and deliver such content in multicast format.

It would therefore be advantageous to provide a solution that would provide self-detection and efficient delivery of real-time popular on-demand OTT streams over MBMS-based cellular communication networks.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all aspects nor delineate the scope of any or all embodiments. Its sole purpose is to present some concepts of one or more embodiments in a simplified form as a prelude to the more detailed description that is presented later. For convenience, the term some aspects may be used herein to refer to a single aspect or multiple aspects of the disclosure.

The disclosed embodiments include a method for delivery of real-time popular recorded over-the-top (OTT) streams in a broadband network. The method includes monitoring OTT streams flow in the broadband network; for each monitored OTT stream, determining if a type of each a monitored OTT stream is a recorded OTT stream; upon determining that the type of an monitored OTT stream is a recorded OTT stream, determining an efficiency in delivering the recorded OTT stream in a multicast format; reformatting the recorded OTT stream into a multicast OTT stream, if the recorded OTT stream can be efficiently delivered in a multicast format; and delivering the recorded OTT stream as a multicast OTT stream to a user edge device over the broadband network.

The disclosed embodiments include a system for delivery of unmanaged over-the-top (OTT) streams in a cellular network. The system includes a processing unit; and a memory, the memory containing instructions that, when executed by the processing unit, configure the system to: monitor OTT streams flow in the broadband network; for each monitored OTT stream, determine if a type of a monitored OTT stream is a recorded OTT stream; upon determining that the type of a monitored OTT stream is a recorded OTT stream, determine an efficiency in delivering the recorded OTT stream in a multicast format; reformat the recorded OTT stream into a multicast OTT stream, if the recorded OTT stream can be efficiently delivered in a multicast format; and deliver the recorded OTT stream as a multicast OTT stream to a user edge device over the broadband network.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
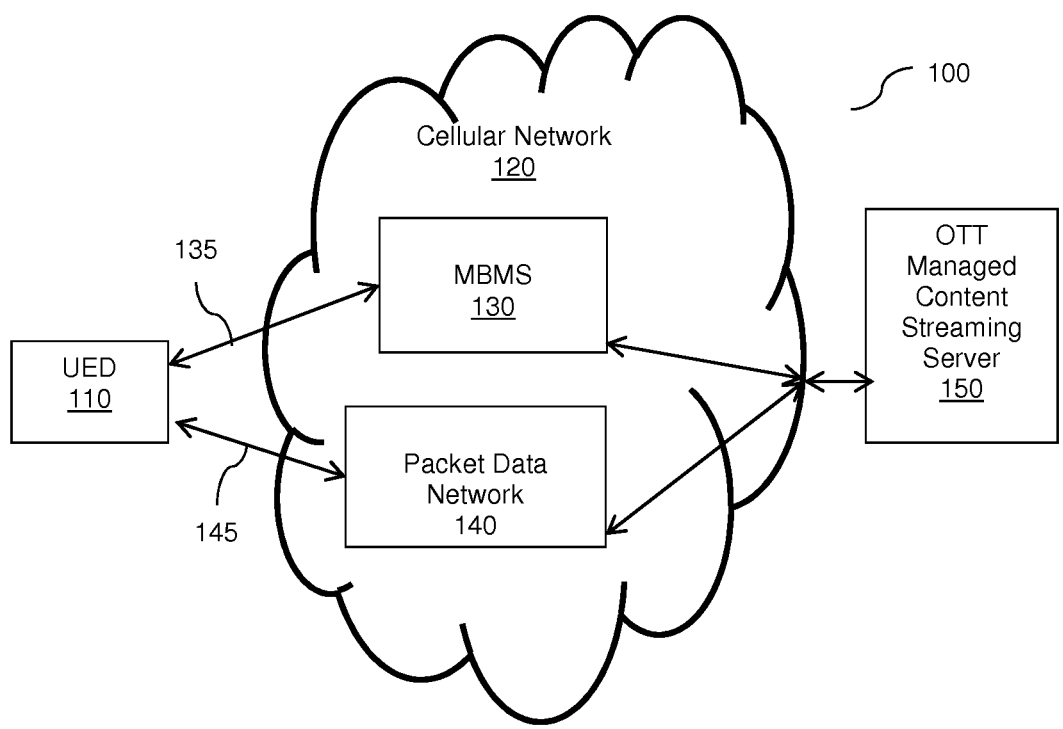
FIG. 1 is a schematic diagram of a cellular network that supports delivery of multicast OTT streams.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Figure 4:
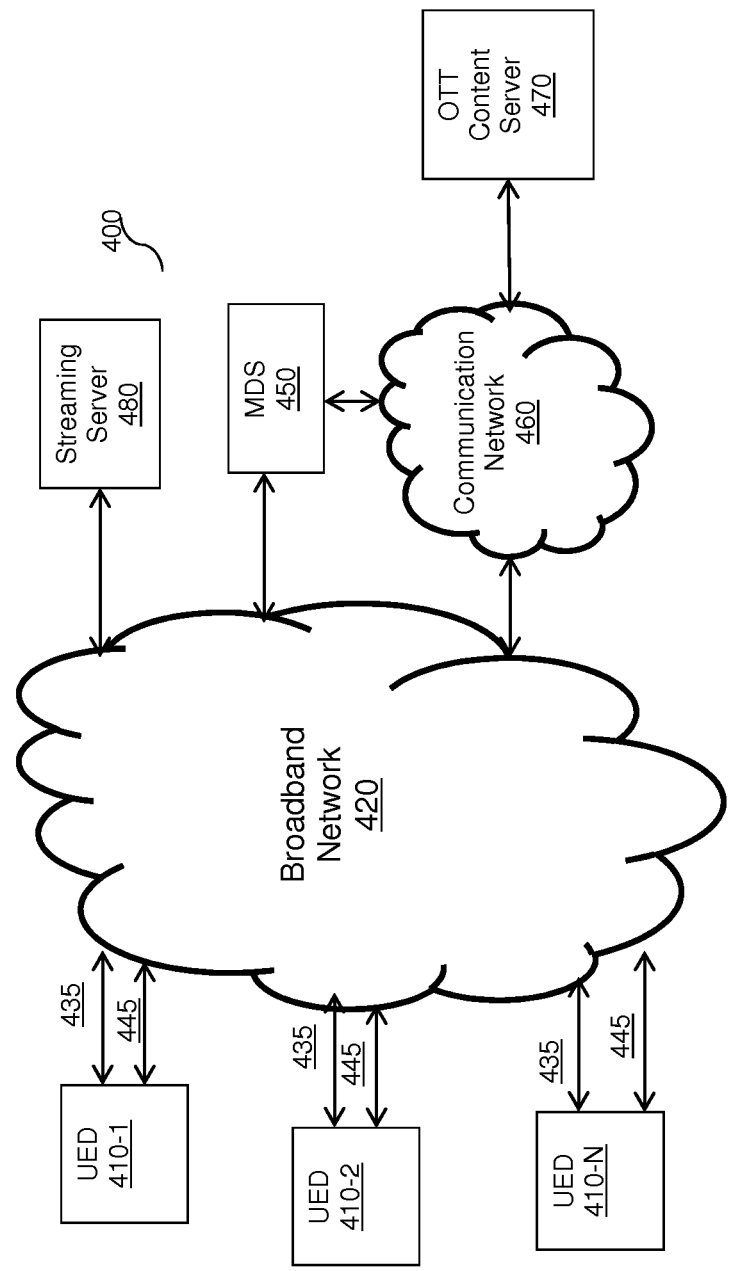
FIG. 4 is a schematic diagram of a content distribution network utilized to describe the various disclosed embodiments.

FIG. 4 is a non-limiting and exemplary diagram of a content distribution network 400 utilized to describe the various embodiments disclosed herein. A plurality of user equipment devices (UEDs) 410-1 through 410-N are communicatively connected to a broadband network 420 through a unicast communication channel 445 and a multicast communication channel 435. The UED 410 may be, but is not limited to, a personal computer, a smart phone, an electronic kiosk, a tablet computer, a smart TV, a wearable computing device, and the like. The UED 410 is configured to execute a media player from any one of a web-browser, an application (e.g., a mobile app), and the like.

In an exemplary embodiment, the broadband network 420 may include a fixed-line network, a cellular network, or a combination thereof. Typically, the broadband network 420 includes several network elements including, but not limited to, switches, routers, digital subscriber line access multiplexers (DSLAMs), cable modem termination systems (CMTS), base transceiver stations (BTS), and so on, through which the end user sends and receives data to and from the Internet. A fixed-line network may include infrastructure such as, but not limited to, cable, fiber optic, digital subscriber line (DSL), or any other communication network allowing connectivity of end users to the Internet. A fixed-line network is typically operated by any of an internet service provider (ISP), a telecom network provider, a cable television (TV) provider, and the like. A cellular network may be operated according to a communication protocol including, for example, the WCDMA, TD-CDMA, TD-SCDMA, and LTE. It should be noted that the connectivity of UEDs such as UED 410 to the broadband network 420 is typically through a local area network (LAN), a wireless LAN (WLAN), and the like.

Figure 2:
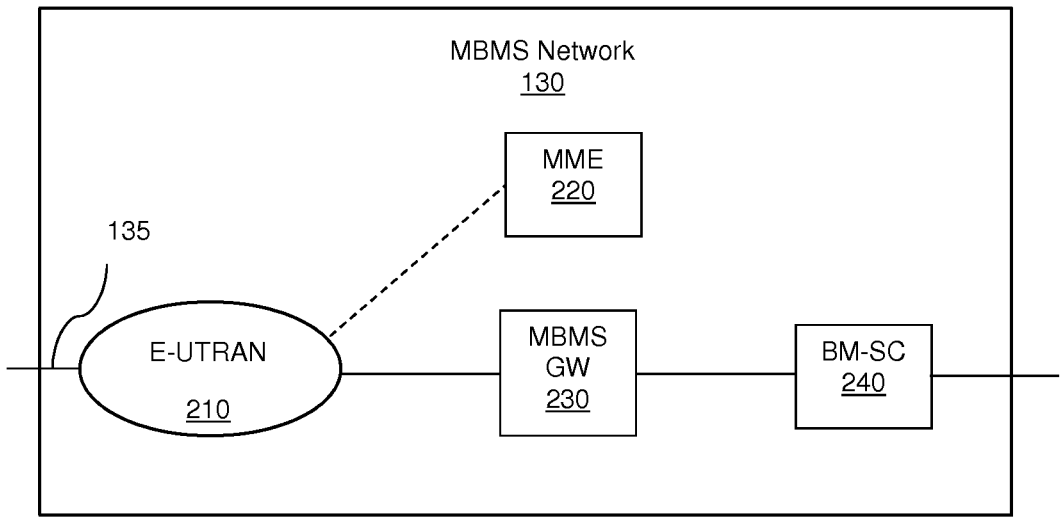
FIG. 2 is a schematic diagram of a MBMS network operable in a cellular network.
Figure 3:
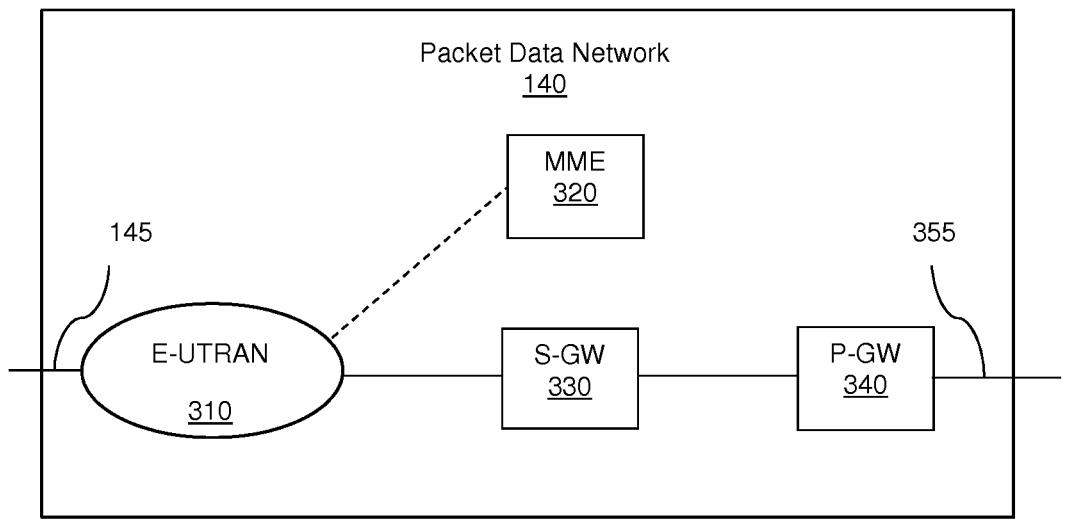
FIG. 3 is a schematic diagram of a packet data network operable in a cellular network.
Figure 6:
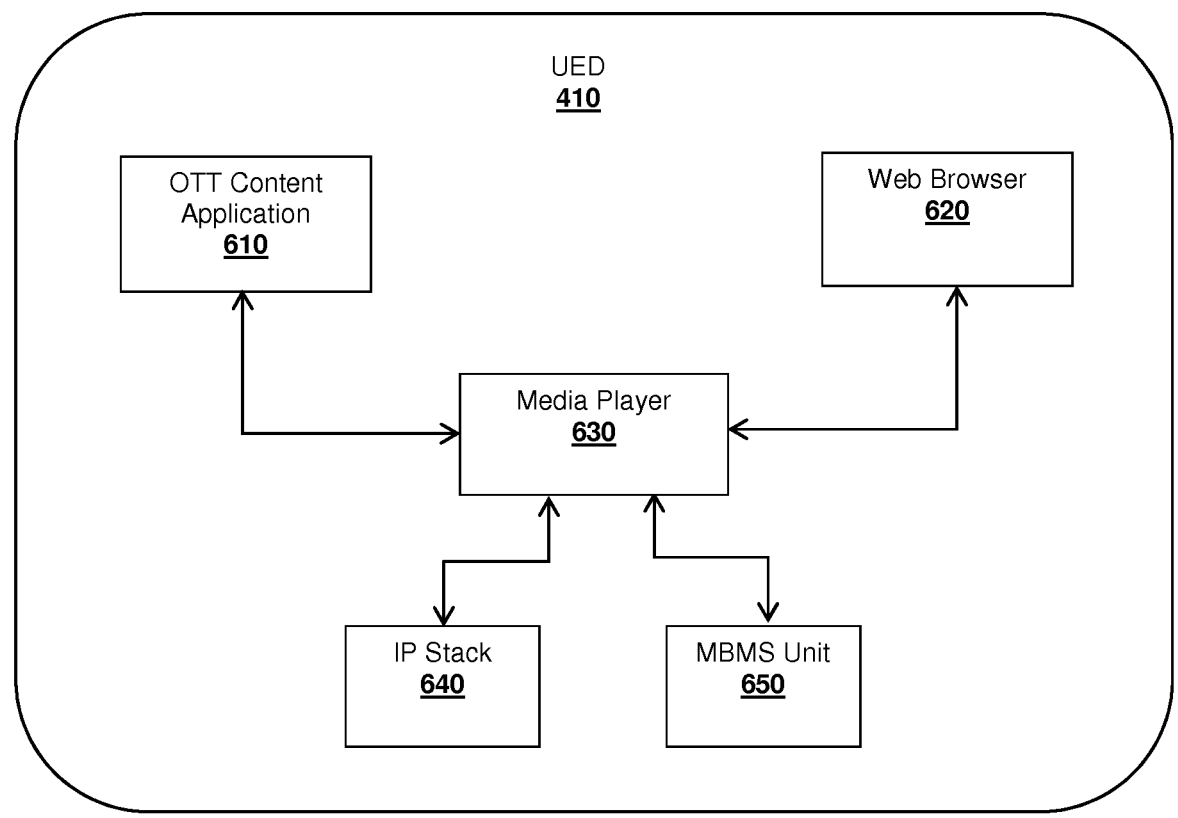
FIG. 6 is a schematic diagram of a user edge device for playing multicast OTT streams received through a multicast channel according to an embodiment.

The broadband network 420 realized as a cellular network typically includes a MBMS network and a packet data network. As discussed above, the MBMS network can serve and deliver multicast OTT streams, while the packet data network carries the unicast data services including unicast OTT streams. The MBMS network is described in further detail herein above with respect to FIG. 2, while the packet data network 440 is discussed in further detail herein above with respect to FIG. 3. As further noted above, a MBMS or eMBMS unit (not shown) delivers multicast streams of OTT content and is typically preconfigured with the streams to be delivered. In this embodiment, the UED 410 includes an interface to the cellular network and an MBMS (or eMBMS) unit (an exemplary UED containing an MBMS unit is shown in FIG. 6). The MBMS unit may be in a form of hardware, middleware, software, or any combination thereof. It should be noted that any means that provide equivalent functionality to the MBMS or eMBMS can be utilized the MBMS unit.

At the other end of the system 400, an OTT content server 470 is also communicatively connected to a communication network 460. The communication network 460 may be a local area network, a wide area network (WAN), a metropolitan area network (MAN), the Internet, and the like. The OTT content server 470 locally hosts or receives the recorded multimedia content from its origin or from a database (not shown) the server 470 is communicatively connected to. The recorded OTT content is an on-demand content. The OTT content server 470 is configured to stream the received or obtained content as OTT content streams to the UED 410 over the broadband network 420 and the communication network 460 as unicast streams. OTT content servers (e.g., OTT content server 470) are typically deployed in datacenters in different geographical locations. Although not shown in FIG. 4, OTT content servers are typically connected to CDNs.

According to an exemplary implementation, the OTT content server 470 streams un-managed recorded OTT content. As such, the operator of the broadband network 420 does not have any information regarding the type of the content being streamed or the number of concurrent viewers. Also connected to the broadband network 420 is a streaming server 480 that streams managed OTT content. The operator of the broadband network 420 controls the operation of the streaming server 480. In an embodiment, the managed OTT content includes recorded content.

A multicast delivery server (MDS) 450 is communicatively connected to the broadband network 420, the streaming server 480, and the communication network 460. The MDS 450 is typically configured to perform the embodiments for efficient delivery of real-time popular recorded OTT streams to the UEDs 410. An OTT recorded stream or OTT recorded content also include non-live, non-linear, or on-demand OTT content. A real-time popular OTT stream or OTT content refers to an OTT recorded streams concurrently viewed by multiple viewers. For example, the movie "Pretty Woman" is a very popular movie, but if the number of concurrent viewers is low, such movie is not considered as real-time popular recorded OTT content. As will be discussed in greater detail below the "concurrence" is determined with respect to preconfigured and relatively time frame, while the number of viewers to determine popularity is with respect to a preconfigured threshold.

According to an embodiment, the MDS 450 is configured to receive, store, and monitor requests for OTT streams to determine if such streams are for real-time popular and if they are for the recorded (or VoD) streams. In an embodiment, a stream may be determined real-time popular if the number of requests during a preconfigured time frame (hereinafter a "Popularity Time Frame" or "PTF") to a specific recorded OTT stream exceeds a predefined threshold (hereinafter a "Content Popularity Threshold" or "CPT"). For example, 10,000 requests from different UEDs to the same recorded OTT stream during a PTF of 10 seconds may be considered a real-time popular recorded OTT stream.

Upon detection of a real-time popular recorded OTT stream, the MDS 450 is configured to determine the efficiency of transmitting such a stream as a multicast stream. In an embodiment, the determination may be based, in part, on the number of requests for the recorded stream from a certain starting time. For example, if a recorded content stream is requested by 100 users, but 20 users would like to watch the movie from the beginning, 40 users would like to watch the movie 15 minutes from the beginning, and 60 users would like to watch the movie 30 minutes from the beginning of the movie, it may not be efficient to multicast the stream. However, if the 100 users request to watch movie within a certain starting time (as a non-limiting example, from 0-5 seconds) from the beginning of the movie, it may be efficient to multicast the stream.

Alternatively or collectively, the determination whether to multicast a recorded OTT stream is based on a trick mode of a media player. The trick mode provided rewind (REW) and fast forward (FF) functions. The functions can be used to determine the offset of the viewed content relatively to its beginning. The detection of the trick mode is based on the streaming protocol being utilized by media player. In a real time messaging protocol (RTMP), for example, if a PLAY message including a time parameter difference than 0, indicates that the trick mode is on. In a HTTP live streaming (HLS) protocol, the detection of the trick mode is determined if a request for non-continuous transport stream (TS) file is received.

In an embodiment, the recorded OTT stream will be not multicasted if the trick mode is one. Alternatively, if the number of requests for recorded OTT stream with an active trick mode having the same time parameter or same non-continuous TS file exceeds the CPT, then such stream may be multicast.

Upon detection of a recorded OTT stream that should be multicast, the MDS is configured to fetch the requested recorded content in its unicast format from the OTT content server 470 via the communication network 460. The MDS 450 is further configured to reformat the unicast stream to a multicast stream to be delivered to the UEDs 410. In an embodiment, all UEDs 410 receive the multicast stream at the same time for all UEDs. The delay for a UED may be up to the duration of the PTF. For example, the UEDs 410-1, 410-2, and 410-N send the request for the same recorded content at $T_1=0$; $T_2=1$ sec; and $T_3=4$ sec, respectively and the PTF is set to 5 seconds. Then, UEDs 410-1, 410-2, and 410-N would wait for the multicast stream 5 seconds, 4 seconds, and 1 second respectively.

In various exemplary embodiments, a unicast format may include, but is not limited to, a RTMP, a HLS protocol, or any other streaming protocol over a transmission control protocol (TCP) connection. A multicast format may include, but is not limited to, RTSP over UDP or HTTP objects over UDP.

In an embodiment, in order to enable the delivery of a requested OTT stream in its multicast format and the proper display of the requested OTT stream over the UED 410, the MDS 450 dynamically configures an MBMS network (not shown) of the broadband network 420 to deliver a multicast stream produced by the server 450 to the UED 410 over the multicast communication channel 435. In addition, the MDS 450 sets the UEDs 410 and, particularly, a MBMS (or eMBMS) unit to tune to a specific multicast channel (e.g., channel 435) and set the player of the UED 410 to request the streamed contents from the MBMS unit. Then, the MDS 450 injects the OTT stream in its multicast format to the broadband network 420.

According to another embodiment, the MDS 450 is further configured to optimize the delivery of the managed OTT content streamed by the streaming server 480. The MDS 450 receives an indication that managed OTT content is being delivered over the broadband network 420. Thereafter, the MDS 450 sets the UEDs 410 and, particularly, a MBMS (or eMBMS) unit in the UEDs 410, to tune to a specific multicast channel (e.g., channel 435).

The MDS 450 also sets the player of the UEDs 410 to request the streamed contents from the MBMS unit. It should be noted that setting of the UED 410 is typically performed in real-time and does not require any provisions by the operator of the network 420 or a user of the UED 410. It should be further noted that one OTT content server 470 and one streaming server 480 are illustrated in FIG. 4 merely for the sake of simplicity of the description. The disclosed techniques can be utilized when OTT content servers and streaming servers are operable in the system 400.

Figure 5:
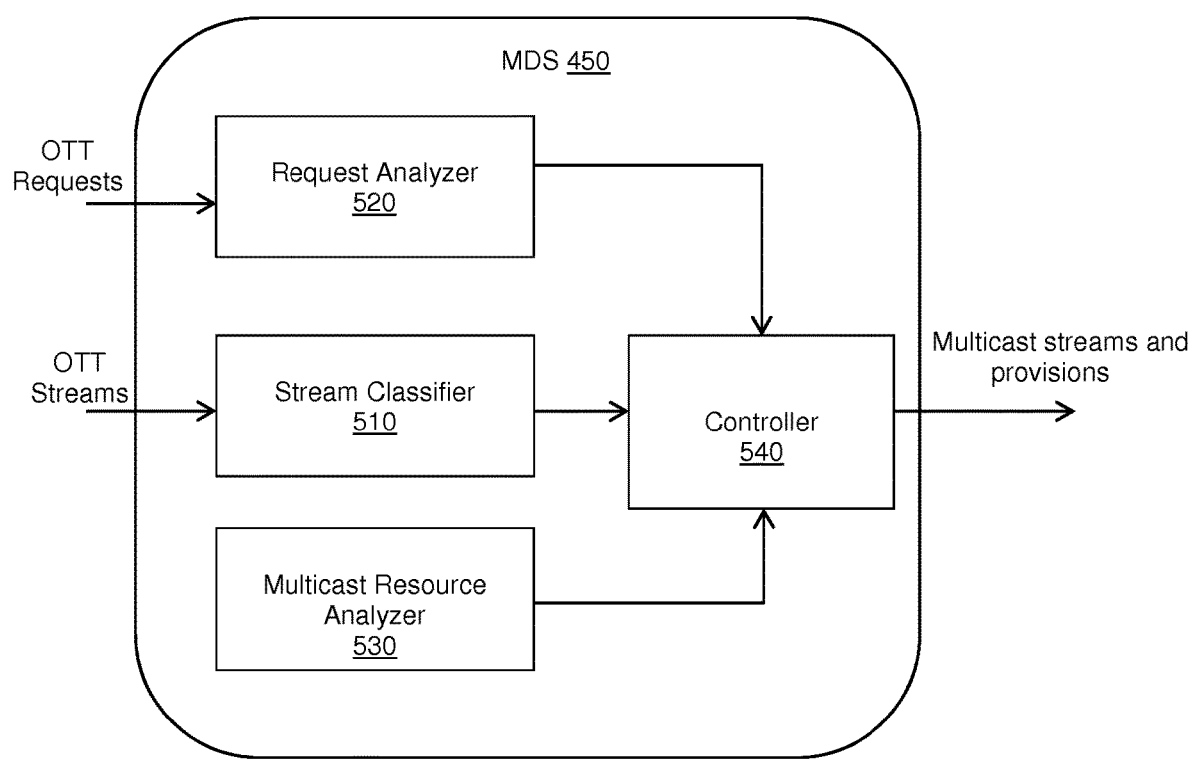
FIG. 5 is a schematic block diagram of a multicast delivery server for self-detection and efficient delivery of real-time popular recorded OTT streams according to one embodiment.

FIG. 5 is an exemplary and non-limiting block diagram of the MDS 450 according to an embodiment. In some implementations, the MDS 450 includes a stream classifier 510, a request analyzer 520, a multicast resource analyzer 530, and a controller 540.

The stream classifier 510 is configured to monitor OTT content streams (i.e., pairs of requests-responses for such streams) flow through the broadband network 420 and determine if each monitor stream is a recorded OTT stream and the real-time popularity of each detected recorded OTT stream.

In an embodiment, the stream classifier 510 is configured to retrieve multiple copies of the requested OTT stream from an OTT content server (e.g., the server 470) through a network (e.g., the network 460) and to analyze the retrieved streams. The copies of the streams are typically time shifted. The stream classifier 510 is configured to search for similar content in the time-shifted streams indicating whether the requested OTT stream is a live, linear, or replicated stream (hereinafter a live stream). If a stream suspected to live stream after processing by the classifier 510 does meet the conditions to be treated as a live stream, such a suspected stream is determined to be recorded OTT stream.

Upon identification of a suspected stream as a recorded OTT stream, an identification of the stream's content is sent to a request analyzer 520. An example for such content identification which may be identified is a uniform resource locator (URL). An example for the operation of the stream classifier 510 can be found in U.S. patent application Ser. No. 14/332,712 filed on Jul. 16, 2014, assigned to the common assignee, and is hereby incorporated by reference for all that it contains.

The request analyzer 520 determines the real-time popularity of each recorded OTT stream. In an embodiment, the request analyzer 520 determines a stream to be real-time popular if the number of requests for the recorded OTT stream received during the PFT is above the CPT. It should be noted that the popularity is checked with respect to each PFT independently. It should be further noted that a new PFT is checked once a previous PFT is elapsed. For example, a recorded OTT stream be popular for a first PFT, but un-popular for the second (consecutive) PFT. Requests during multiple PFTs can proceeds in parallel. In another embodiment, request analyzer 520 is further configured to determine if a trick mode is associated with the request and/or the recorded OTT streams. Exemplary embodiments for detecting the trick mode are discussed above.

The multicast resource analyzer 530 is configured to retrieve information from the broadband network 420 in order to identify the available multicast resources. The retrieved information may include, but is not limited to, the number of available multicast channels and the available bandwidth for each channel.

The controller 540 is configured to determine, based on the inputs received from the request analyzer 520 and the multicast resource analyzer 530, if there is a unicast OTT stream which is currently being delivered as unicast that can be transmitted in a multicast format. Such determination may involve consideration of one or more of the following inputs: content real time popularity (i.e., how many active users request this content during the PTF), multicast resource availability, the trick mode, and so on. For example, a stream for a real time popular content would be delivered in a multicast format to the UED over the broadband network if there is at least one available multicast channel for streaming the content in a multicast format.

If such OTT stream is determined to be delivered in its multicast format, the controller 540 is configured to reformat the unicast stream into a multicast stream. For example, the stream can be converted from a HLS over TCP format to a HTTP Objects over UDP format.

In an exemplary embodiment, the reformatting of a unicast stream into a multicast stream is performed at two separate layers: an application layer and a transport layer. The processing at the application layer comprises fragmenting a unicast OTT large size transport stream (TS) file into a set of small size (i.e., having a preconfigured size) TS files. This is performed in order to compensate for the unreliability of a UDP used to transport the multicast traffic. Optionally, reformatting at the transport layer may also be applied by replacing the TCP layer with the UDP layer The controller 540 is further configured to provision the multicast resources (e.g., MBMS resources) in the broadband network 420 upon deciding to transmit an on-demand OTT stream in a multicast format. In one embodiment, the provisioning of the MBMS resources includes configuring a BM-SC (e.g., BM-SC 240, FIG. 2) with a set of parameters to establish a new MBMS and to begin injecting the OTT stream into the BM-SC's data interface. The set of parameters may include, but are not limited to, a bandwidth, quality of service (QoS), forward error correction (FEC) parameters, TMGI (multicast group ID), and the like.

In response to provisioning of its operation respective of the MBMS resources, the multicast channels to connect to the UEDs 410 are provided. The controller 540 also configures the UEDs 410 (not shown in FIG. 5) to receive and play the multicast stream. In an embodiment, this includes tuning a MBMS unit in the UED 410 to the provided multicast channel, thereby setting the player of the UED 410 to request the streamed content from a MBMS unit. Upon establishing a connection with the UED, the controller 540 begins a session and transfers the multicast stream through the MBMS network 430.

In certain implementations, the MDS 450 also comprises one or more network interfaces (not shown) to interface with one or more networks (e.g., broadband network 420 and communication network 460, not shown), one or more processing systems (not shown), and a memory (not shown), the memory containing instructions to be executed by the processing system. In some implementations, each of the stream classifier 510, the request analyzer 520, the multicast resource analyzer 530, and the controller 540 may be realized by a processing system. The processing system may comprise or be a component of a larger processing system implemented with one or more processors. The one or more processors may be implemented with any combination of general-purpose microprocessors, microcontrollers, digital signal processors (DSPs), field programmable gate arrays (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

FIG. 6 is an exemplary and non-limiting schematic diagram of a UED 410 configured to play an OTT stream in a multicast format according to an embodiment. As illustrated in FIG. 6, an OTT content application 610 configured to play OTT content is installed in the UED 410. Alternatively or collectively, a web browser 620 may also be installed in the UED 410. Both the UED 410 and the web browser 620 are connected to a media player 630 installed in the UED 410. The UED 410 also includes a MBMS unit 650 configured to receive OTT content streams in a multicast format. The MBMS unit 650 may be implemented as eMBMS middleware as defined in the 3GPP standard. In an exemplary configuration, the MBMS unit 650 is integrated at the UED 410. In certain embodiments, the MBMS unit 650 may be realized as hardware, software, middleware, or a combination thereof.

The OTT content application 610 and/or web browser 620 sends a request to an OTT content server (not shown) for the content to be viewed. Then, the OTT content application 610 and/or web browser 620 loads the requested content to the media player 630. In this embodiment, since the MBMS unit 650 is fully integrated within the UED 410, the media player 630 can play back content received from the cellular network either as unicast or as multicast streams. In an embodiment, the MBMS unit 650 implements a multicast client toward the cellular network and a unicast server toward the media player 630. That is, the MBMS unit 650 acts as a proxy element between multicast and unicast streams, thereby enabling the media player 630 to communicate with the MBMS unit 650 over unicast protocol (e.g., HTTP/MPEG-DASH over TCP), while the MBMS unit 650 receives the content over a multicast channel (e.g., MPEG-DASH over UDP or HTTP objects over UDP).

An OTT operator (not shown) and/or its CDN (not shown) typically streams the content in unicast format. As a result, the media player 630 may issue a request for media in a unicast format from an IP stack 640. Such requests are captured by a server (e.g., the MDS 450). As a result, the server redirects the request to the MBMS unit 650 in order to obtain the content in its multicast format.

In an exemplary implementation of a redirect procedure, the playlist response sent from an OTT content server is captured by the MDS 450 by means of a controller (e.g., the controller 540). The playlist is modified such that, instead of requesting the content segments (for example, in HLS, such segments are also known as .TS files) from the OTT content server, such segments are requested from the HTTP server implemented at the MBMS unit 650.

Figure 7:
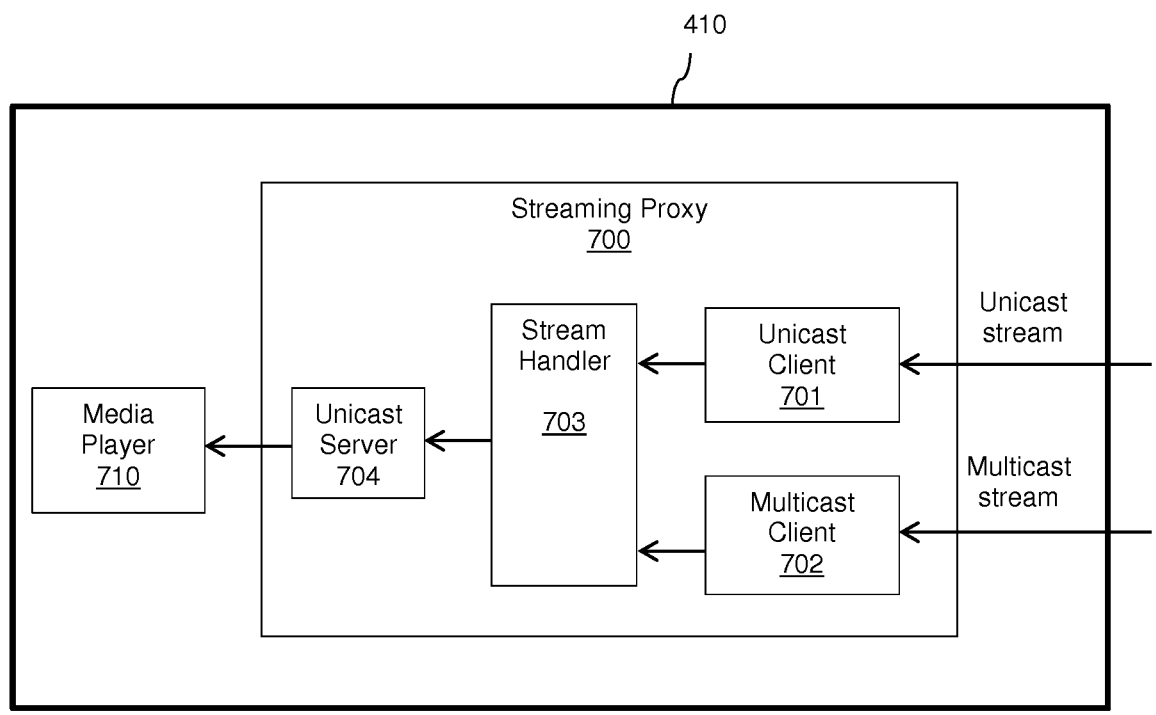
FIG. 7 is a schematic diagram of a UED equipped with a streaming proxy and a media player according to an embodiment.

FIG. 7 shows a block diagram of the UED 410 equipped with a streaming proxy 700 and a media player 710. A media player 710 is operable in the UED 410 and configured to play over-the-top (OTT) content streams from an OTT content server. The media player 520 may be a standalone application or executed from a web-browser, an application (e.g., a mobile app), and the like. The media player 710 may not support multicast streaming. Thus, the proxy 700 is configured to adapt a received multicast stream to a unicast format.

The streaming proxy 700 includes a unicast client 701, a multicast client 702, a stream handler 703, and a unicast server 704. The unicast and multicast clients 701 and 702, respectively, implement unicast and multicast protocols, respectively, such as those mentioned above.

The unicast client 701 is connected to a unicast stream source such as the OTT content server 470, and the multicast client 702 is connected to the MDS 450. The stream handler 703 is configured to select the proper source (i.e., unicast or multicast) from the stream to the media player 710 that should be delivered. The stream handler 703 is also configured to convert the stream from its multicast format to a unicast format when the multicast source is selected. That is, in order to maintain transparency for the media player 710, an OTT stream received in a multicast format (e.g., RTSP over User Datagram Protocol (UDP) or hypertext markup language (HTML) object over UDP) may be reformatted into a unicast format supported by the media player 710 (e.g., a RTMP over TCP or HLS over TCP format).

The unicast server 704 receives a stream's content in a unicast format from the handler 703 and streams the content to the media player 710. The unicast server 704 can implement any of the unicast streaming protocols noted above.

In some embodiments, the streaming proxy 700 is further configured to switchover from a selected source to another source such as, e.g., from a unicast to multicast streaming source, or vice-versa. The switchover decision may be taken based on various parameters. In one embodiment, the switchover may be required if, for example, the number of users attempting to access the OTT content increases such that switching from several unicast streams to one multicast stream would decrease bandwidth and improve user experience. In such cases, the streaming proxy may be configured to temporarily retrieve both the multicast and unicast streams, thereby enabling the stream to continue uninterrupted as the UED 410 transitions from providing a unicast stream to providing a multicast stream.

It should be noted that the switching from one source to the other is performed without stopping, delaying, or impacting the reception of a stream played by the media player 710. That is, from the viewer's perspective, the transition to a different OTT streaming source is seamless and would not impact the QoE provided to a viewer of the media player 710.

In certain implementations, the streaming proxy 700 may be implemented in an external system communicatively connected to the UED 410. In one implementation, the streaming proxy 700 may be realized as a virtual machine executed in such an external system. Accordingly, an instance of the streaming proxy 700 is created for each user terminal. An example for the operation of the streaming proxy 700 can be found in U.S. patent application Ser. No. 14/339,035 filed on Jul. 23, 2014, assigned to the common assignee, and hereby incorporated by reference for all that it contains. Another optional implementation for the UED 410 and the proxy 700 can be found in U.S. patent application Ser. No. 14/456,301 filed on Aug. 11, 2014, assigned to the common assignee, and hereby incorporated by reference for all that it contains.

Figure 8:
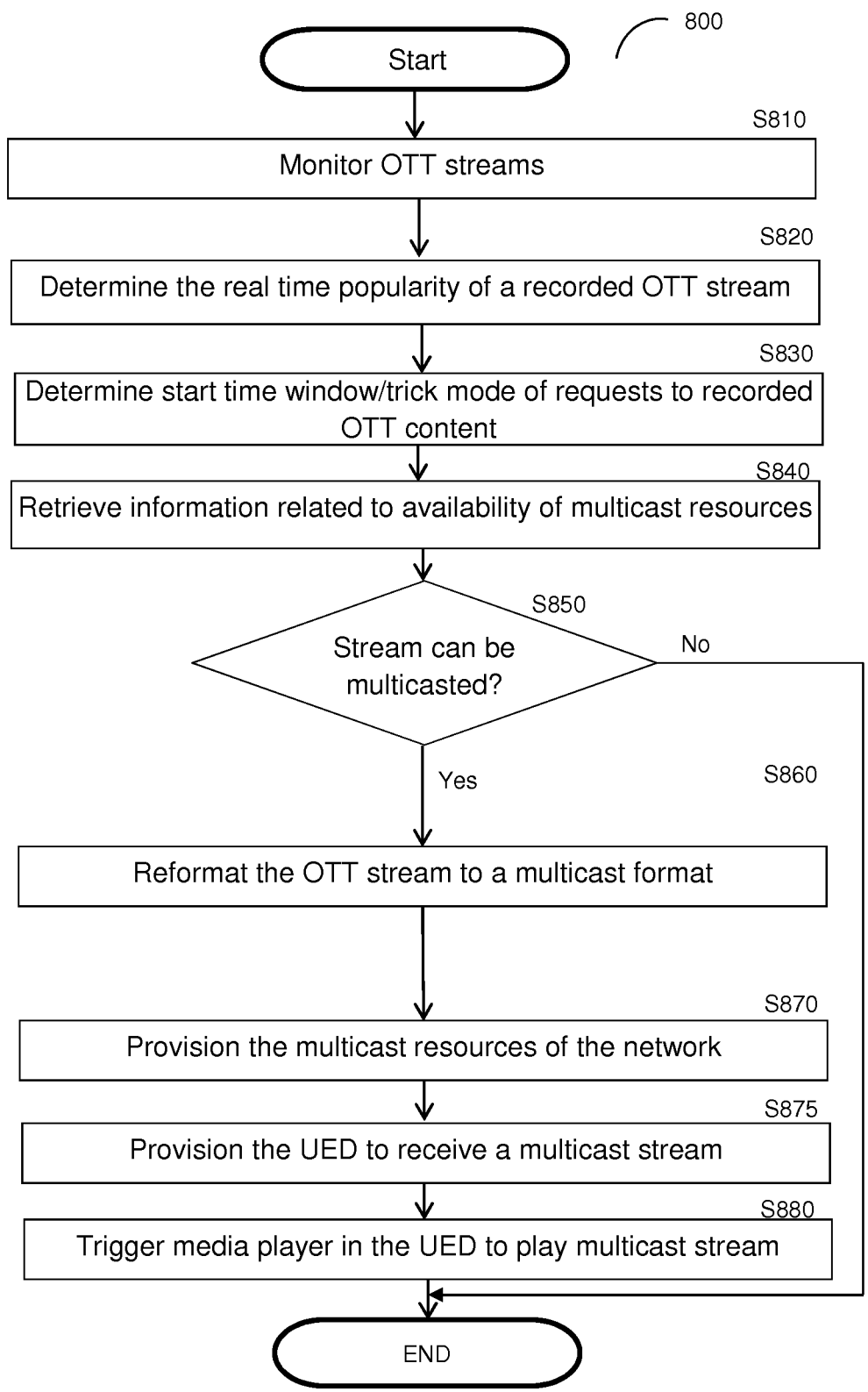
FIG. 8 is a flowchart showing operation of a method for self-detection and efficient delivery of real-time popular recorded OTT streams according to an embodiment.

FIG. 8 is an exemplary and non-limiting flowchart 800 illustrating operation of the MDS 450 according to one embodiment. In S810, OTT content streams flow to and from a broadband network are monitored to determine if each of monitored streams is a recorded OTT stream. In one embodiment, the monitored streams can be forwarded by a deep packet inspection (DPI) element, a service chaining element, or a routing network element. The forwarding decision by any of these elements is based on a set of rules such as, but not limited to, a destination IP address designated in the request. The destination IP address may be, for example, an IP address of an OTT content server In an embodiment, a stream that is suspected to be a live, linear, or replicated stream is analyzed. If the analysis results in a determination that such a stream is not live, linear or replicated streams, the stream is determined to be a recorded OTT stream.

In S820, the real time popularity of the each recorded OTT stream is determined. In an exemplary embodiment, this includes checking if the number of requests to the recorded OTT streams a PTF exceeds a predefined threshold the CPT. The PTF and the CPT are configurable parameters. As a non-limiting example, if it is determined that 150 requests for a recorded OTT stream have been detected during a period of 10 sec, the stream is determined to be real time popular. In an embodiment, all requests received during the PFT to a real time popular OTT recorded stream are saved, for example, by the request analyzer 520. It should be noted that the popularity is checked with respect to each PFT independently. It should be further noted that a new PFT is checked once a previous PFT is elapsed. For example, a recorded OTT stream may be popular for a first PFT, but un-popular for the second (consecutive) PFT. Requests during multiple PFTs can be processed in parallel.

In S830, the requests to the recorded OTT stream are further analyzed to determine if the requests are to play the recorded content approximately (e.g., a predefined interval) at the same time relative to the beginning of the recorded content (hereinafter "start time window"). For example, if all requests are to play the recorded content, a start time window may be 0-5 seconds from the beginning of the content.

Alternatively or collectively, S830 also includes detection of a trick mode associated with each request. The detection of the trick mode is based on the streaming protocol being utilized by the media player. In a RTMP, for example, if a PLAY message including a time parameter difference than 0, this indicates that the trick mode is on or active. In a HLS protocol, the detection of the trick mode is if a request for non-continuous transport stream (TS) file is received.

In S840, information related to the availability of multicast resources is retrieved or otherwise determined. In an embodiment, such information may be retrieved from MBMS resources in the network. Such retrieved information may include, but is not limited to, a number of available multicast channels, an available bandwidth for each channel, and so on.

In S850, the efficiency in delivering the recorded OTT stream in a multicast format is determined. That is, if the recorded OTT stream can be or need to be multicasted. If S850 results with a Yes answer, execution continues with S860; otherwise, execution terminates. Such determination may be based on, but is not limited to, the real-time popularity of the recorded OTT stream, the trick mode, the number of requests related to same start time window, multicast resources' availability, a content type of the stream (i.e., whether the stream is of a type that can be transmitted in a multicast format without additional processing such as, e.g., the additional processing required for on-demand OTT content streams), and so on, and any combinations thereof.

In an embodiment, the recorded OTT stream will be not multicast if the requests for the recorded contents are out synchronization, i.e., the content is requested to be viewed at different times relatively to its beginning. As noted above, this can be determined based on the trick mode. For example, if some or all of the requests are for non-continuous TS file or with PLAT messages with time parameters with different values, the respective recorded OTT streams is not multicast. Alternatively, if the number of requests for recorded OTT stream with an active trick mode having the same time parameter or same non-continuous TS file exceeds the CPT, then such stream may be multicast.

In S860, the requested recorded OTT stream is reformatted into a multicast format. As a non-limiting example, a stream may be converted from a HLS over TCP format to a HTTP objects over a UDP format. In an embodiment, reformatting of a unicast stream into a multicast stream may be performed at two separate layers, an application layer and a transport layer. The conversion, in an exemplary embodiment, includes fragmenting a unicast OTT stream into a set of small (i.e., having a preconfigured size) transport stream (TS) segments.

Optionally, in S870, the multicast resources such as, but not limited to, MBMS resources of the network are provisioned to receive the recorded OTT stream in its multicast format. In an embodiment, triggering of the MBMS network may include configuring a BM-SC (e.g., BM-SC 240) with a set of parameters to establish a new MBMS and to start injecting the OTT stream with the BM-SC's data interface. Such parameters may include, but are not limited to, bandwidth, quality of service (QoS), forward error correction (FEC) parameters, TMGI (multicast group IDs), and the like.

Optionally, in S875, the UED and, specifically, a MBMS unit in the UED, are provisioned to receive an OTT stream in its multicast format. In S880, an UED media player in the UED is triggered to play the multicast content delivered through the MBMS network using redirection.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

Also, it should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements. In addition, terminology of the form "at least one of A, B, or C" or "one or more of A, B, or C" or "at least one of the group consisting of A, B, and C" or "at least one of A, B, and C" used in the description or the claims means "A or B or C or any combination of these elements." For example, this terminology may include A, or B, or C, or A and B, or A and C, or A and B and C, or 2A, or 2B, or 2C, and so on.

Although some benefits and advantages of the preferred embodiments are mentioned, the scope of the disclosure is not intended to be limited to particular benefits, uses, or objectives. Rather, embodiments of the disclosure are intended to be broadly applicable to different wireless technologies, system configurations, networks, and transmission protocols, some of which are illustrated by way of example in the figures and in the description.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for delivery of currently popular recorded over-the-top (OTT) streams in a broadband network, comprising:
monitoring OTT streams flow in the broadband network using a stream classifier;
for each monitored OTT stream,
retrieving, from an OTT content server, a plurality of time-shifted copies of content similar to the content of the monitored OTT stream;
determining, using the stream classifier and based on the plurality of time-shifted copies of content, if a type of the monitored OTT stream is of a recorded OTT content;
upon determining that the type of the monitored OTT stream is of recorded OTT content,
determining an efficiency in delivering the recorded OTT content in a multicast format, wherein the determination is based on a number of requests for the recorded OTT content having substantially the same start window;
reformatting the recorded OTT content into a multicast OTT stream, when the recorded OTT stream can be efficiently delivered in a multicast format; and delivering the recorded OTT content as a multicast OTT stream to a plurality of user edge devices over the broadband network.

2. The method of claim 1, further comprising:
determining if the recorded OTT content is a real time popular stream;
determining an availability of multicast resources in the broadband network; and
determining a number of requests to the recorded OTT content for playing the recorded OTT content during a start time window relatively to the beginning of the recorded OTT content.

3. The method of claim 2, wherein the recorded OTT content is determined to be a real time popular stream when a number of requests to the recorded OTT content during a preconfigured time frame exceeds a preconfigured threshold.

4. The method of claim 3, wherein the real time popularity determination is independently performed for each preconfigured time frame.

5. The method of claim 2, wherein determining the number of requests to the recorded OTT content for playing the recorded OTT content during a start time window relatively to the beginning of the recorded OTT content, further comprising:
determining if a trick mode associated with the requests is active.

6. The method of claim 2, wherein the information related to the availability of multicast resources in the broadband network is at least one of: a number of available multicast channels and an available bandwidth for each channel.

7. The method of claim 1, wherein delivering the recorded OTT content further comprising:
provisioning multicast resources in the broadband network to deliver the multicast OTT stream to a user edge device; and
provisioning multicast resources in the user edge device to receive and play the multicast OTT stream over the user edge device.

8. The method of claim 1, wherein reformatting the recorded OTT content into a multicast OTT stream is performed on at least one of: an application layer, and a transport layer.

9. The method of claim 1, wherein the recorded OTT content is of any one of: a managed content, and unmanaged content.

10. The method of claim 1, wherein the recorded OTT content includes any one of: on-demand content, non-live content, and non-linear content.

11. The method of claim 1, wherein the broadband network is at least one of: a fixed-line network, a cellular network, and a wireless network.

12. A non-transitory computer readable medium having stored thereon instructions for causing one or more processing units to execute the method according to claim 1.

13. A system for delivery of unmanaged over-the-top (OTT) streams in a cellular network, comprising:
a processing unit; and
a memory, the memory containing instructions that, when executed by the processing unit, configure the system to:
monitor OTT streams flow in the broadband network using a stream classifier;
retrieve, from an OTT content server, a plurality of time-shifted copies of content similar to the content of the monitored OTT stream;
for each monitored OTT stream, determine, using the stream classifier and based on the plurality of time-shifted copies of content, if a type of the monitored OTT stream is of a recorded OTT;
upon determining that the type of the monitored OTT stream is of recorded OTT content, determine an efficiency in delivering the recorded OTT content in a multicast format, wherein the determination is based on a number of requests for the recorded OTT content having substantially the same start window;
reformat the recorded OTT content into a multicast OTT stream, when the recorded OTT content can be efficiently delivered in a multicast format; and
deliver the recorded OTT content as a multicast OTT stream to a plurality of user edge devices over the broadband network.

14. The system of claim 13, wherein the system further is configured to:
determine if the recorded OTT content is a real time popular stream;
determine an availability of multicast resources in the broadband network; and
determine a number of requests to the recorded OTT content for playing the recorded OTT content during a start time window relatively to the beginning of the recorded OTT content.

15. The system of claim 14, wherein the recorded OTT content is determined to be a real time popular stream when a number of requests to the recorded OTT content during a preconfigured time frame exceeds a preconfigured threshold.

16. The system of claim 14 wherein the real time popularity determination is independently performed for each preconfigured time frame.

17. The system of claim 14, wherein the system is further configured to:
determine if a trick mode associated with the requests is active.

18. The system of claim 14, wherein the information related to the availability of multicast resources in the broadband network is at least one of: a number of available multicast channels and an available bandwidth for each channel.

19. The system of claim 13, wherein the system further is configured to:
provision multicast resources in the broadband network to deliver the multicast OTT stream to a user edge device; and
provision multicast resources in the user edge device to receive and play the multicast OTT stream over the user edge device.

20. The system of claim 13, wherein the recorded OTT content is of any one of: a managed content and unmanaged content.

21. The system of claim 13, wherein the recorded OTT content includes any one of: on-demand content, non-live content, and non-linear content.

22. The system of claim 13, wherein the broadband network is at least one of: a fixed-line network, a cellular network, and a wireless network.

* * * * *